Nov. 25, 1958    K. G. SCHOEFFEL    2,861,545
CALF FEEDING DEVICE
Filed Oct. 14, 1957
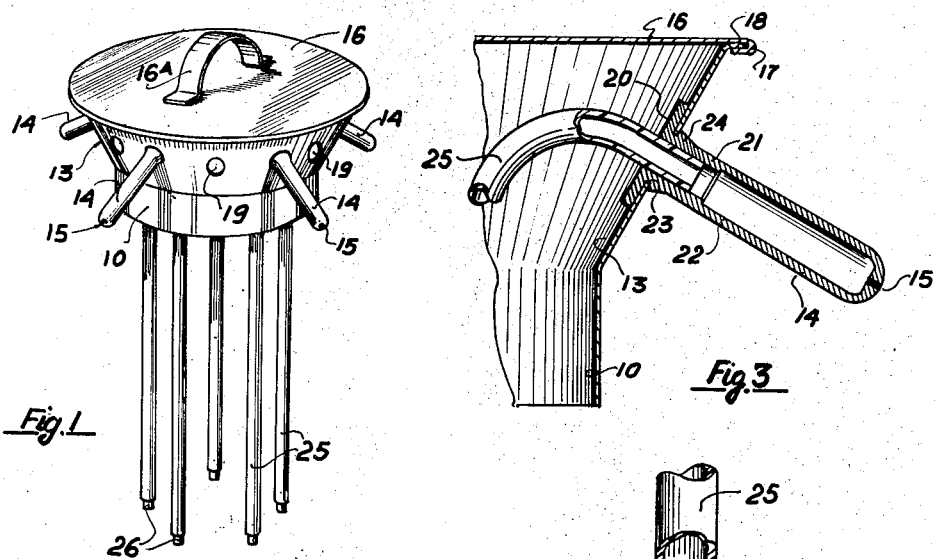
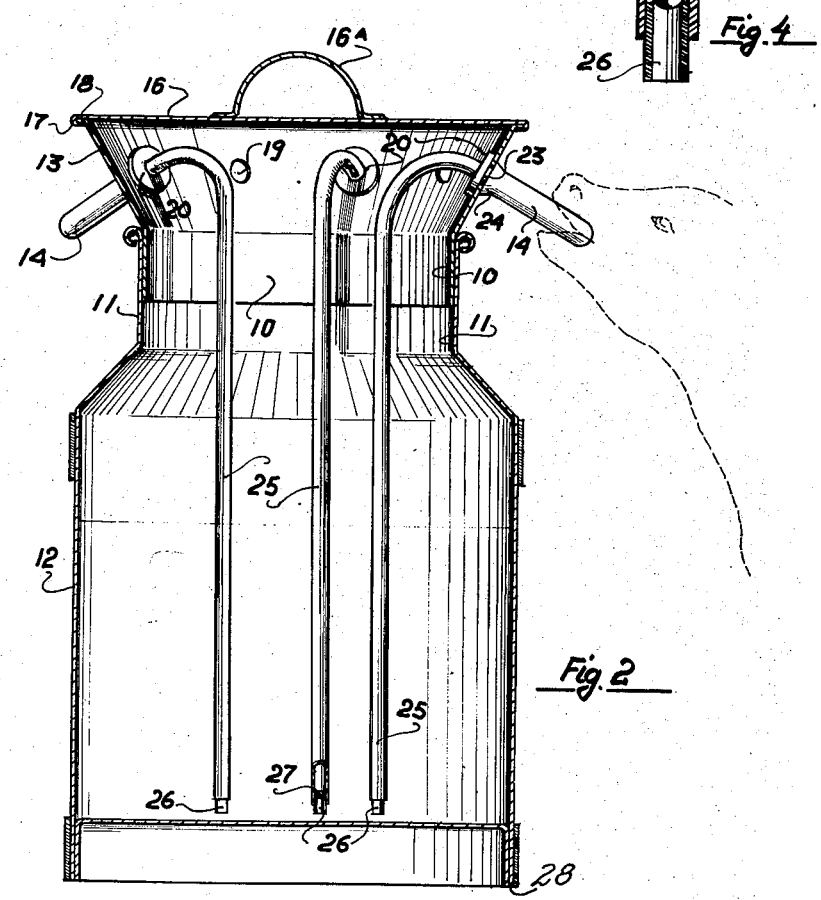

United States Patent Office 2,861,545
Patented Nov. 25, 1958

2,861,545
CALF FEEDING DEVICE

Kenton G. Schoeffel, Cotswold Farm, Menzies Creek, Victoria, Australia, assignor to Ellen Jean Schoeffel, Cotswold Farm, Menzies Creek, Victoria, Australia Application October 14, 1957, Serial No. 689,985

Claims priority, application Australia October 31, 1956

9 Claims. (Cl. 119—71)

This invention relates to an improved calf feeding device and refers especially to a device which is capable of use with standard milk containers to enable calves to feed from the device unaided. The device is also capable of being used for feeding other animals, such as lambs.

To the best of my knowledge it has not hitherto been found practicable to provide a calf feeder of the type which can be used with existing milk cans, buckets and other utensils, and which will allow the calf to draw milk efficiently from the container, without the necessity for providing special means on the container or for removing the milk to another vessel, which can be quickly assembled and disassembled, and which will continue in efficient operation throughout the feeding. It is an object of this invention to provide a calf feeder which achieves the abovementioned result in a simple and effective manner.

According to the present invention, I provide a calf feeding device comprising a funnel member having a side wall and a lower annular portion, the lower annular portion being adapted to be attached to the upper end of a milk container, an aperture in the lower annular portion which is adapted to communicate with the interior of the milk container, a series of holes in the side wall of the funnel member, teats of resilient material the inner ends of which fit through the holes in the side wall of the funnel member, an annular groove in each teat which engages the periphery of the respective hole in the funnel member, a peripheral integral rib on each teat outwardly of the annular groove therein, the said rib being of greater diameter than the respective hole in the funnel member and engaging the outer surface of the side wall of the funnel member around said hole, milk supply tubes of resilient material, the upper ends of which fit within the inner ends of the teats and communicate with the interior of said teats, the milk supply tubes being arranged to extend downwardly through the aperture in the lower annular portion of the funnel member, the upper end of each milk supply tube being arranged to extend within the respective teat to a point outwardly of the side wall of the funnel member, and the normal external diameter of the upper end of each milk supply tube being greater than the normal internal diameter of the teat whereby the inner end of each teat and the upper end of each milk supply tube are under compression and are thus held firmly in their respective positions.

In use, the calves suck on the teats mounted on the funnel member and are able to draw milk from the bottom of the milk container through the flexible tubes which connect to the teats. By this means it is possible to utilize existing milk containers for calf feeding, and it is found that substantially all the milk in the container can be drawn therefrom by the calves without the need for modification of the container or transference of the milk therefrom. After the container has been emptied, the device may be readily removed therefrom and transferred to a full container or, if the feeding has been completed, the device may be removed for cleaning.

Other objects and features of the invention will be apparent from the ensuing description of the preferred form of the invention illustrated in the accompanying drawings, wherein:

Figure 1 is a perspective view of the calf feeding device,

Figure 2 is an enlarged view in sectional elevation of the devices fitted to a milk container, Figure 3 is an enlarged fragmentary sectional view showing the construction and method of attachment of a teat, and Figure 4 is an enlarged fragmentary view, partly in section, of the lower end of a tube, showing the non-return valve.

Referring to the drawings, the device shown therein comprises a cylindrical ring-shaped member 10 of sheet metal or like material, which is adapted to fit within the neck 11 of a milk can 12. The ring-shaped member 10 is formed integrally with a tapered or conical member 13, which tapers upwardly and outwardly from the upper edge of the ring-shaped member 10, the conical member 13 being thus of a larger diameter at its upper end than at its lower end.

The angle of inclination of the conical member 13 is preferably such that a teat 14, extending at right angles thereto, as hereinafter described, is disposed at a convenient angle and elevation for engagement by the mouth of the calf, so as to ensure a satisfactory flow of milk to the outer end of the teat 14 at which is formed the aperture 15 for withdrawal of the milk.

A cover or lid 16 of sheet metal or other suitable material is arranged to fit over the upper end of the conical member 13, and the periphery of the cover or lid 16 is secured to the periphery of the upper end of the conical member 13. Conveniently, the upper edge of the conical member 13 is bent outwardly in a horizontal direction and the periphery 17 of the lid or cover 16 is turned downwardly and inwardly over the flange 18 thus formed on the conical member 13 and is crimped thereto. A handle 16A is fitted to the lid or cover 16.

A series of holes 19 are formed in the conical member 13 at intervals there-around, each of said holes 19 being adapted to receive a teat 14 of rubber, plastic or other resilient material. The holes 19 are preferably located at points substantially equidistant between the upper and lower edges of the conical member 13.

Each teat 14 is of cylindrical formation and is provided with a hemispherical outer end in which is formed an aperture 15 through which milk may flow. The wall of the teat 14 is of greater thickness at its inner portion 21 than at its outer portion 22, so that the outer portion 22 is of greater flexibility and has a larger bore than the inner portion 21. The teat 14 is provided at its inner end with an integral disc-shaped flange 20 which is adapted to engage the inner surface of the conical member 13 around the hole 19 therein. An annular groove or channel 23 is formed in the periphery of the teat 14 adjacent to the flange 20, the said groove 23 being of such size and shape that it will accommodate neatly the periphery of the hole 19 in the conical member 13 when the teat 14 has been fully inserted through said hole so as to project outwardly from the conical member 13. The teat 14 is formed with a peripheral rib 24 spaced at a short distance outwardly from the inner flange 20 so as to form the groove 23 between the rib 24 and the flange 20. The outer surface of the rib 24 tapers from the groove 23 towards the outer end of the teat 14 until it meets the cylindrical outer surface of the teat 14. The inner face of the rib 24 is radial, and the width of the groove 23 formed on the teat 14 is slightly wider than the thickness of the conical member 13, so that the teat 14 is held in position on the conical member 13 while, at the same time, the fitting of the teat 14 in position can be accomplished quickly and easily. The provision of a groove or channel 23 in the teat 14, as above described, has the important advantage that not only is the teat 14 held in position without the need for any special attachments, and said teat may be easily removed from the hole 19 in the conical member 13 when so desired, but in addition the teat 14 is prevented from being pushed inwardly through the hole 19 by the calf when drinking therefrom.

A tube 25 of rubber, plastic, or other resilient material is secured at its upper end to the inner end of each teat 14 and is arranged to pass downwardly through the ring-shaped member 10 and downwardly within the milk can 12 to a point adjacent to its bottom 28. A tube 25 is provided for each teat 14 and all of these tubes 25 depend downwardly into the milk container in this manner. A non-return valve is provided at the lower end of each tube 25, which may comprise a metal or other ball 27 resting on the upper end of a tubular member 26 which is fitted within the lower end of the tube 25. The non-return valve prevents the milk in the tube 25 from falling back into the container when the calf ceases to suck, and thus reduces the energy expended by the calf and prevents the sucking of air by the calf.

The upper end of each tube 25 is secured to the inner end of its corresponding teat 14 by fitting the end of the tube 25 within the inner end of its corresponding teat 14 and, for this purpose, the diameter of the tube 25 is made greater than the internal diameter or bore of the teat 14 at its inner end. Preferably, the normal external diameter of the tube 25 is 5 to 20% greater than the normal internal diameter of the teat 14. Due to the resilient nature of the teat 14 and of the tube 25, it is possible to fit the end of the tube 25 within the inner end of the teat 14 without difficulty and to then insert the teat 14 through the corresponding hole 19 in the conical member 13. The relative diameters of the said hole 19 and of the teat 14 and tube 25 are such that when the teat 14 and tube 25 have been assembled in position in the hole 19 in the conical member 13, the pressure exerted by the periphery of the said hole 19 on the teat 14 serves to compress the teat 14 and also to compress the tube 25 within the bore in the teat 14 and thus prevents the teat from becoming dislodged from the hole 19 and the tube 25 from becoming dislodged from within the teat 14. Hence, even though the tube 25 can be easily fitted within the teat 14 when the teat is removed from the device, the tube 25 is firmly clamped in position in the teat 14 when the teat is in position on the device.

When it is desired to remove the teats 14 and the teat 14 is held firmly in the hole 19 and tubes 25 for cleaning or other purposes, it is merely necessary to push the teats 14 inwardly through the holes 19 in the conical member 13 until they are released therefrom, the rib 24 on the teat 14 being caused to flex so as to allow it to pass through the hole 19 in the conical member 13, and the tubes 25 may then be disconnected from the teats 14 and the various parts of the device may be sterilized or otherwise treated.

It will be understood that any desired number of teats 14 may be provided around the periphery of the device and that these may be inclined at any desired angle, but it has been found convenient to dispose the teats 14 so that they are inclined downwardly at an angle of approximately 30° from the horizontal. Preferably, the teat 14 is at right angles to the conical member 13 which is thus preferably at an angle of about 60° to the horizontal.

A feature of the invention is that this device ensures an even and equal feed for all calves; either young calves or mature calves may be fed from the same unit and each receives approximately the same amount of feed.

It is found that a steady milk flow is obtained by the combination of a sucking action and a syphoning action which enables milk to be drawn by the calf from the bottom of a normal milk container, which result has not hitherto been achieved in a satisfactory manner. An advantage of the device is that it may be set up for feeding in a very short time.

What I claim is:

1. A calf feeding device comprising a funnel member having a side wall and a lower annular portion, said lower annular portion being adapted to be attached to the upper end of a milk container, an aperture in said lower annular portion which is adapted to communicate with the interior of said milk container, a series of holes in said side wall, teats of resilient material the inner ends of which fit through said holes, an annular groove in each teat which engages the periphery of one of said holes, a peripheral integral rib on each teat outwardly of the annular groove therein, the said rib being of greater diameter than the respective hole and engaging the outer surface of said side wall around said hole, milk supply tubes of resilient material the upper ends of which fit within the inner ends of said teats and communicate with the interior of said teats, said milk supply tubes being arranged to extend downwardly through said aperture, the upper end of each of said milk supply tubes being arranged to extend within the respective teat to a point outwardly of said side wall, and the normal external diameter of the upper end of each of said milk supply tubes being greater than the normal internal diameter of each of said teats whereby the inner end of each teat and the upper end of each milk supply tube are under compression and are thus held firmly in their respective positions.

2. A calf feeding device according to claim 1 wherein each teat is formed with a flange on its inner end which engages the inner surface of said side wall.

3. A calf feeding device according to claim 1 wherein the teats are disposed at intervals around said funnel member and extend at an angle outwardly and downwardly therefrom.

4. A calf feeding device according to claim 1 wherein the width of each annular groove in each teat is slightly greater than the thickness of said side wall.

5. A calf feeding device according to claim 1 wherein the outer surface of each peripheral rib on each teat tapers in the direction of the free end of the teat.

6. A calf feeding device according to claim 1 wherein the normal external diameter of each milk supply tube is 5 to 20% greater than the normal internal diameter of the inner end of each teat.

7. A calf feeding device according to claim 1 and having a non-return valve in the lower end of each milk supply tube.

8. A calf feeding device according to claim 1 and having a non-return valve in the lower end of each milk supply tube, the non-return valve comprising a ball which normally rests on the upper end of a tubular member fitted within the lower end of the milk supply tube.

9. A calf feeding device comprising a funnel member having a side wall and a lower annular portion, said lower annular portion being shaped to fit within the neck of a milk container, an aperture in said lower annular portion which is adapted to communicate with the interior of said milk container, a series of holes in said side wall and spaced at intervals therearound, teats of resilient material the inner ends of which fit through said holes, an annular flange on the inner end of each teat which engages the inner surface of said side wall, a peripheral rib on each teat which engages the outer surface of said side wall, an annular groove in each teat between said annular flange and said peripheral rib, the base of said annular groove being in contact with the periphery of the hole in said side wall, a series of milk supply tubes of resilient material the upper ends of which fit within the inner ends of said teats, said milk supply tubes being arranged to extend downwardly through said aperture, the upper end of each milk supply tube extending within the respective teat to a point outwardly of said side wall, and the normal external diameter of the upper end of each milk supply tube being 5% to 20% greater than the normal internal diameter of the inner end of said teats whereby the inner end of each teat and the upper end of each milk supply tube are under compression within the peripheral edge of said holes and are thus held firmly in their respective positions.

References Cited in the file of this patent

UNITED STATES PATENTS

| | | |
|---|---|---|
| 840,632 | Krumling | Jan. 8, 1907 |
| 1,062,657 | Moore | May 27, 1913 |
| 2,522,820 | Haberkorn | Sept. 19, 1950 |
| 2,583,041 | Coyner | Jan. 22, 1952 |
| 2,714,368 | Voigt et al. | Aug. 2, 1955 |

FOREIGN PATENTS

| | | |
|---|---|---|
| 3,276 | Great Britain | Mar. 9, 1886 |